(12) United States Patent
Fettaya et al.

(10) Patent No.: US 11,714,695 B2
(45) Date of Patent: Aug. 1, 2023

(54) REAL TIME DETECTION OF METRIC BASELINE BEHAVIOR CHANGE

(71) Applicant: Microsoft Technology Licensing, LLC, Redmond, WA (US)

(72) Inventors: Raphael Fettaya, Herzliya (IL); Rachel Lemberg, Herzliya (IL); Yaniv Lavi, Herzliya (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/390,389

(22) Filed: Jul. 30, 2021

(65) Prior Publication Data
US 2023/0031109 A1    Feb. 2, 2023

(51) Int. Cl.
G06F 11/00     (2006.01)
G06F 11/07     (2006.01)
G06N 20/10     (2019.01)

(52) U.S. Cl.
CPC ...... *G06F 11/0751* (2013.01); *G06F 11/0709* (2013.01); *G06N 20/10* (2019.01)

(58) Field of Classification Search
None
See application file for complete search history.

(56) References Cited

U.S. PATENT DOCUMENTS

2019/0340392 A1   11/2019   Khorrami et al.
2019/0373007 A1   12/2019   Salunke et al.
2020/0204576 A1*   6/2020   Davis ..................... H04L 63/20
2020/0285997 A1    9/2020   Bhattacharyya et al.
2020/0311603 A1   10/2020   Qiu et al.
2021/0157702 A1*   5/2021   Lemberg .............. G06F 11/3433
2021/0168042 A1*   6/2021   Mijumbi ................ H04L 43/08

OTHER PUBLICATIONS

Google Scholar/Patents search—text refined (Year: 2022).*
Google Scholar/Patents search—text refined (Year: 2023).*
Barbhuiya, et al., "RADS: Real-time Anomaly Detection System for Cloud Data Centres", In Repository of arXiv:1811.04481v1, Nov. 11, 2018, pp. 1-14.

(Continued)

*Primary Examiner* — Christopher S McCarthy

(57) ABSTRACT

Example aspects include techniques for real-time detection of metric baseline behavior change. These techniques may include generating a reference distance signature based on historic time series information for a component metric, the historic time series information corresponding to a first period of time, generating a sample distance signature based on sample time series information for the component metric, the sample time series information corresponding to a second period of time, and comparing the reference distance signature to the sample distance signature to determine a signature difference. In addition, the techniques may include determining that the second period of time is a baseline change candidate based on the signature difference being greater than a distance threshold, and presenting, based at least in part on the signature difference, an alert notification identifying the second period of time as the baseline change candidate.

20 Claims, 4 Drawing Sheets

(56) References Cited

OTHER PUBLICATIONS

Bui, et al., "A Fault Detection and Diagnosis Approach for Multi-tier Application in Cloud Computing", In Journal of Communications and Networks, vol. 22, Issue 5, Oct. 5, 2020, pp. 399-414.
Daley, Brandon L., "USBeSafe: Applying One-Class SVM for Effective USB Event Anomaly Detection", In Thesis of Northeastern University, Apr. 25, 2016, 95 Pages.
Gillespie, et al., "Real-time Analytics at the Edge: Identifying Abnormal Equipment Behavior and Filtering Data near the Edge for Internet of Things Applications", In Journal of SAS Conference Proceedings: SAS Global Forum, Apr. 2, 2017, 5 Pages.
Trinh, et al., "Data driven hyperparameter optimization of one-class support vector machines for anomaly detection in wireless sensor networks", In Proceedings of International Conference on Advanced Technologies for Communications (ATC), Oct. 18, 2017, pp. 6-10.
"International Search Report and Written Opinion Issued in PCT Application No. PCT/US22/035379", dated Oct. 10, 2022, 13 Pages.

\* cited by examiner

300

GENERATE A REFERENCE DISTANCE SIGNATURE BASED ON HISTORIC TIME SERIES INFORMATION FOR A COMPONENT METRIC, THE HISTORIC TIME SERIES INFORMATION CORRESPONDING TO A FIRST PERIOD OF TIME
302

GENERATE A SAMPLE DISTANCE SIGNATURE BASED ON SAMPLE TIME SERIES INFORMATION FOR THE COMPONENT METRIC, THE SAMPLE TIME SERIES INFORMATION CORRESPONDING TO A SECOND PERIOD OF TIME
304

COMPARE THE REFERENCE DISTANCE SIGNATURE TO THE SAMPLE DISTANCE SIGNATURE TO DETERMINE A SIGNATURE DIFFERENCE
306

DETERMINE THAT THE SECOND PERIOD OF TIME IS A BASELINE CHANGE CANDIDATE BASED ON THE SIGNATURE DIFFERENCE BEING GREATER THAN A DISTANCE THRESHOLD
308

PRESENT, BASED AT LEAST IN PART ON THE SIGNATURE DIFFERENCE, AN ALERT NOTIFICATION IDENTIFYING THE SECOND PERIOD OF TIME AS THE BASELINE CHANGE CANDIDATE
310

FIG. 3

REAL TIME DETECTION OF METRIC BASELINE BEHAVIOR CHANGE

BACKGROUND

A cloud computing environment may provide one or more services to customers over a network. Further, the cloud computing environment may employ a monitoring service for detecting issues arising within the cloud computing environment. In some instances, anomaly detection may be used to determine when patterns in data do not match an expected pattern. For example, a monitoring service may perform anomaly detection over cloud computing performance data associated with the one or more services to detect a service issue. However, in some contexts, an undetected service issue may correspond to a baseline change that does not include behavior that would qualify as anomalous, e.g., the probabilistic change in the distribution of a time series may rise or fall without spiking above or below the thresholds used to detect anomalous activity. Detecting baseline changes requires computation involving large amounts of historic data. As a result, baseline change detection is typically performed offline due to high computational costs at scale and/or the inability of traditional approaches to detect baseline changes with a cadence sufficient for real-time monitoring solutions.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In an aspect, a method may include generating a reference distance signature based on historic time series information for a component metric, the historic time series information corresponding to a first period of time, generating a sample distance signature based on sample time series information for the component metric, the sample time series information corresponding to a second period of time, and comparing the reference distance signature to the sample distance signature to determine a signature difference. The method may further include determining that the second period of time is a baseline change candidate based on the signature difference being greater than a distance threshold, and presenting, based at least in part on the signature difference, an alert notification identifying the second period of time as the baseline change candidate.

In another aspect, a device may include a memory storing instructions, and at least one processor coupled to the memory and to execute the instructions to: generate a reference distance signature based on historic time series information for a component metric, the historic time series information corresponding to a first period of time, generate a sample distance signature based on sample time series information for the component metric, the sample time series information corresponding to a second period of time, compare the reference distance signature to the sample distance signature to determine a signature difference, determine that the second period of time is a baseline change candidate based on the signature difference being greater than a distance threshold, and present, based at least in part on the signature difference, an alert notification identifying the second period of time as the baseline change candidate.

In another aspect, an example computer-readable medium storing instructions for performing the methods described herein and an example apparatus including means of performing operations of the methods described herein are also disclosed.

Additional advantages and novel features relating to implementations of the present disclosure will be set forth in part in the description that follows, and in part will become more apparent to those skilled in the art upon examination of the following or upon learning by practice thereof.

BRIEF DESCRIPTION OF THE DRAWINGS

The Detailed Description is set forth with reference to the accompanying figures, in which the left-most digit of a reference number identifies the figure in which the reference number first appears. The use of the same reference numbers in the same or different figures indicates similar or identical items or features.

FIG. 3 is a flow diagram illustrating an example method for evaluating peer groups for comparative anomaly, in accordance with some aspects of the present disclosure.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes techniques for real-time detection of baseline change of a cloud component metric. In particular, aspects of the present disclosure provide a baseline monitoring module configured to periodically generate a reference signature representing a historic baseline for a component metric and a sample signature representing recently-collected measurements of the component metric, and utilize the difference between the signatures to detect baseline change for the component metric within a cloud computing environment. As used herein, in some aspects, a component metric may refer to one or more measurements associated with activity of a component and/or user of the cloud computing environment. Accordingly, for example, a cloud computing environment may employ the baseline monitoring module to perform detection of probabilistic change in the distribution of measurements of a cloud component metric at the cadence needed for at least near-real time monitoring in a cloud computing environment, which may be used to improve system performance and/or reduce time to mitigate service incidents.

In accordance with some aspects of the present disclosure, a baseline monitoring module is configured to accurately and efficiently detect baseline change based on signature dissimilarity in at least near-real time, e.g., less than ten minutes. For example, the baseline monitoring module may be configured to employ one-class support vector model (SVM) to generate a reference signature representing the baseline of a cloud component metric and periodically generate sample signatures representing measurements of the cloud component metric over a recent period of time. Further, the baseline monitoring module may detect a baseline change when a dissimilarity measurement between the reference signature and a sample signature is greater than a preconfigured threshold. By using signatures generated with minimal computational cost to identify baseline changes, the baseline monitoring module provides an efficient monitoring process that can monitor for baseline changes at a cadence that can be employed for real-time monitoring within a cloud computing environment.

Illustrative Environment

Figure 1:
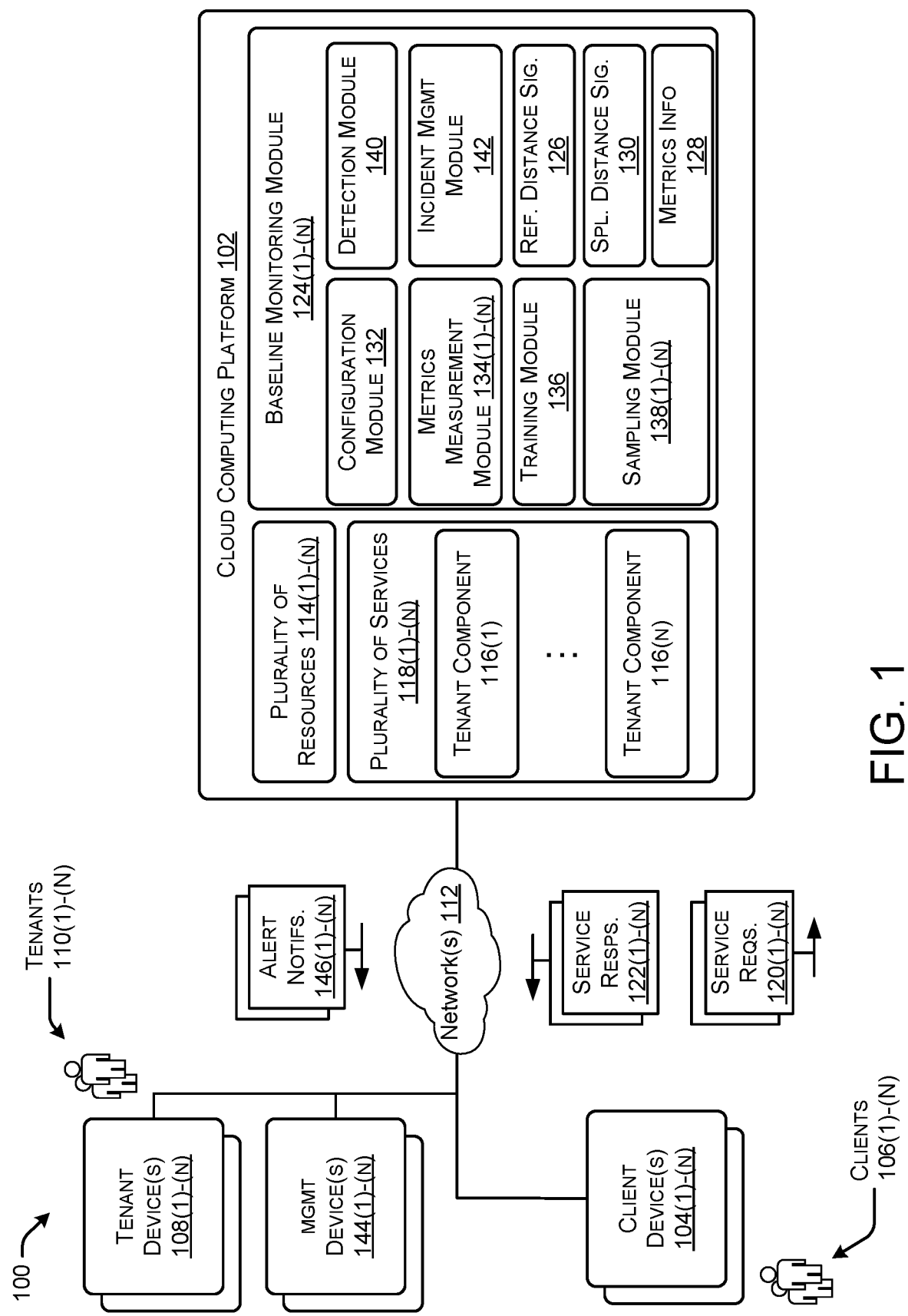
FIG. 1 is a diagram showing an example of a cloud computing system, in accordance with some aspects of the present disclosure

FIG. 1 is a diagram showing an example of a cloud computing system 100, in accordance with some aspects of the present disclosure. As illustrated in FIG. 1, the cloud computing system 100 may include a cloud computing platform 102, a plurality of client devices 104(1)-(n) associated with a plurality of clients 106(1)-(n), and a plurality of tenant devices 108(1)-(n) associated with a plurality of tenants 110(1)-(n). The cloud computing platform 102 may be a multi-tenant environment that provides the client devices 104(1)-(n) with access to applications, services, files, and/or data via one or more network(s) 112. In particular, the cloud computing platform 102 may implement a multi-tenant architecture wherein the resources 114(1)-(n) of the cloud computing platform 102 are shared among the tenants 110(1)-(n) but individual data associated with each tenant 110 is logically separated. As described herein, the tenants 110(1)-(n) may be customers of the cloud computing platform 102. Further, the tenants 110(1)-(n) may have relationships with the plurality of clients 106(1)-(n), and provide one or more tenant components 116(1)-(n) to the plurality of client devices 104(1)-(N) via the cloud computing platform 102.

As an example, the tenant component 116(1) may be a website, and the client device 104(1) may provide a visitor access to the website. Further, the tenant 110(1) associated with the tenant component 116(1) may employ the cloud computing platform 102 to provide features of the website (i.e., tenant component 116(1)) to the client device 104(1). For instance, the tenant component 116(1) may configure the cloud computing platform 102 to transmit the content of the website to the client device 104(1) via the network 112. As another example, the tenant component 116(2) may be a database instance and the client device 104(1) may include a tenant application that utilizes the database instance via the network 112.

The network(s) 112 may comprise any one or combination of multiple different types of networks, such as cellular networks, wireless networks, local area networks (LANs), wide area networks (WANs), personal area networks (PANs), the Internet, or any other type of network configured to communicate information between computing devices (e.g., the cloud computing platform 102, the client devices 104(1)-(N), the tenant devices 108(1)-(n)). Some examples of the client devices 104(1)-(n) and the tenant devices 108(1)-(n) include computing devices, smartphone devices, Internet of Things (IoT) devices, drones, robots, process automation equipment, sensors, control devices, vehicles, transportation equipment, tactile interaction equipment, virtual and augmented reality (VR and AR) devices, industrial machines, virtual machines, etc.

Further, each tenant component 116 may be provided via one or more services 118 of the cloud computing platform 102. Some examples of the services 118(1)-(N) include infrastructure as a service (IaaS), platform as a service (PaaS), software as a service (SaaS), database as a service (DaaS), security as a service (SECaaS, big data as a service (BDaaS), a monitoring as a service (MaaS), logging as a service (LaaS), internet of things as a service (IOTaaS), identity as a service (IDaaS), analytics as a service (AaaS), function as a service (FaaS), and/or coding as a service (CaaS). Further, the resources 114(1)-(n) may be reserved for use by the services 118(1)-(n). Some examples of the resources 114(1)-(n) include computing units, bandwidth, data storage, application gateways, software load balancers, memory, field programmable gate arrays (FPGAs), graphics processing units (GPUs), input-output (I/O) throughput, data/instruction cache, physical machines, virtual machines, clusters of virtual machines, clusters of physical machines, etc. Further, the client devices 104(1)-(n) may transmit service requests 120(1)-(n) and receive service responses 122(1)-(n) corresponding to the service requests 120(1)-(n) in order to access the tenant components 116(1)-(n).

As illustrated in FIG. 1, the cloud computing platform 102 may further include a baseline monitoring module 124 configured to perform real-time baseline change detection on component metrics collected within the cloud computing platform 102. Some examples of categories of component metrics include request duration metrics, dependency duration metrics, and client performance metrics. Further, the aforementioned categories of component metrics may be measured for any activity on the cloud computing platform 102.

An example of a request duration metric may be the amount of time that elapses between the receipt of a service request 120 at the tenant component 116(1) and transmission of the service response 122(1) by the tenant component 116(1). An example of a client performance metric may be an amount of time that elapses during completion of a process by a tenant component 116(1) for a type of a client (e.g., a type of browser, operating system, and/or client application). In addition, as described in detail herein, a baseline change may not be detected by an anomaly detector tuned to detect spikes (i.e., anomalous values) in a component metric as no spike would be observed. In addition, traditional baseline change detection is performed offline and unable to detect baseline change in real time at scale.

The cloud computing platform 102 may employ the baseline monitoring module 124 to periodically determine reference distance signatures 126(1)-(n) for the component metrics in a training phase based on the metrics information 128. Further, in a detection phase, the cloud computing platform 102 may employ the baseline monitoring module 124 to periodically determine sample distance signatures 130(1)-(n) for the component metrics in real-time or near-real time, and compare each reference distance signature 126 to a corresponding sample distance signature 130 to determine the occurrence of a baseline change with respect to the component metric.

Further, as illustrated in FIG. 1, the baseline monitoring module 124 may include at least one of a configuration module 132, a metrics measurement module 134, a training module 136, a sampling module 138, a detection module 140, and/or an incident management module 142. In some aspects, the configuration module 132 may configure baseline change detection at the cloud computing platform 102. For example, the configuration module 132 may be configured to set the component metrics that will be monitored by the baseline monitoring module 124, and one or more parameters for baseline change detection for each component metric at the cloud computing platform 102. In some aspects, the tenant devices 108(1)-(n) associated with the tenants 110(1)-(n) and/or the management devices 144(1)-(n) associated with an employee of the cloud computing platform 102 may provide the one or parameters for performing baseline change detection. For example, the tenant device 108(1) associated with the tenant component 116(1) may provide one or more parameters for monitoring one or more component metrics of the tenant component 116(1) for baseline change. As another example, the management device 144 may provide one or more parameters for monitoring one or more component metrics of the resources 114 for baseline change. Further, the configuration module 132 may be configured to set the entities (e.g., the tenant devices 108, management devices 144) that will be notified of the detection of a baseline change.

The metrics measurement module 134 may be configured to determine the metrics information 128 representing measurements of the component metrics. In some aspects, the metrics information 128 may include request duration measurements, dependency duration measurements, and/or client performance measurements associated with the cloud components (e.g., the resources 114(1)-(n), the tenant component 116(1)-(n), the services 118(1)-(n), etc.). Further, in some aspects, the metrics measurement module 134 may measure a component metric based at least in part on one or more parameters provided to the configuration module 132. Additionally, or alternatively, in some aspects, the metrics measurement module 134 may receive measurements from cloud components associated with the measurement and generate the metrics information 128. In addition, the metrics measurement module 134 may provide the metrics information 128 to the training module 136, the sampling module 138, and/or the detection module 140.

The training module 136 may be configured to periodically generate reference distance signatures 126(1)-(n) for the component metrics of the cloud computing platform 102. In some aspects, the training module 136 may employ a machine learning technique (e.g., one-class SVM) to generate the reference distance signatures 126(1)-(n) using historic data from the metrics information 128 collected over a preconfigured period of time, e.g., the past seven days, and store the reference distance signatures 126(1)-(n) for use by the detection module 140.

In some aspects, the training module 136 may perform one or more pre-processing steps on the metrics information 128 prior to generating the reference distance signatures 126 for the component metrics. For example, the training module 136 may identify a time series for a component metric within the metrics information 128, deseasonalize the time series, and/or remove outliers within the time series that are below or above preconfigured thresholds. As used herein in some aspects, deseasonalizing may refer to removing or reducing a seasonal component of a time series. Further, the training module 136 may scale the time series to a preconfigured range (e.g., between 0 and 1), and/or remove one or more anomalies and/or outages via an offline algorithm. Further, the training module 136 may employ a one-class SVM with the pre-processed time series. For example, the training module 136 may determine a plurality of support vectors via a one-class SVM based on the pre-processed time series information, compute a matrix of pairwise distances between each pair of the support vectors, and determine a kernel of the matrix. In some aspects, the training module 136 may employ gaussian radial basis function (RBF) as the kernel function used to generate the kernel. As used herein, in some aspects, the kernel of a linear map, also known as the null space or nullspace, is the linear subspace of the domain of the map which is mapped to the zero vector.

In some aspects, the training module 136 may be further configured to determine distance thresholds to be employed by the detection module 140 to implement baseline change detection for the component metrics. For example, the training module 136 may be configured to partition a time series for a component metric of a cloud component into a plurality of time series windows, and determine a distance score for each of the plurality of time series windows. In some aspects, each distance score represents a distance between an individual time series window and the other plurality of time series windows. Further, the training module 136 may determine the distance threshold by generating a vector of the distance scores and applying a three-sigma calculation to the vector to identify an abnormal score for the time series as the distance threshold.

The sampling module 138 may be configured to periodically generate sample distance signatures 130(1)-(n) for the component metrics of the cloud computing platform 102. In some aspects, the sampling module 138 may employ a machine learning technique (e.g., one-class SVM) to periodically (e.g., every five minutes) generate the sample distance signatures 130(1)-(n) using recently-collected data from the metrics information 128 over a preconfigured period of time, e.g., the preceding four hours, and provide the same distance signatures 130(1)-(n) to the detection module 140. As used herein, in some aspects, one-class SVM may refer to an unsupervised algorithm that learns a decision function for novelty detection: classifying new data as similar or different to the training set. As described in detail herein, in some aspects, one-class SVM may be employed to encapsulate all instances of a same class in a hyperplane (e.g., plurality of support vectors), thereby providing a concise representation (e.g., the reference distance signatures, 126 and the sample distance signatures 130). Further, the baseline monitoring module 124 may compare the concise representations generated by different one-class SVMs to determine an occurrence of a baseline change. In some aspects, a distance between representations may be used to identify a baseline change. E.g., if the distance is greater than the distance threshold determined by the training module 136, the baseline monitoring module 124 may determine that a baseline change has occurred.

In some aspects, the sampling module 138 may perform one or more pre-processing steps on the recently-collected metrics information 128 prior to generating the sample distance signatures 130 for the component metrics. For example, the sampling module 138 may identify a time series for a component metric within the metrics information 128, deseasonalize the time series, and/or remove outliers within the time series that are below or above preconfigured thresholds. Further, the sampling module 138 may scale the time series to a preconfigured range (e.g., between 0 and 1). In addition, the sampling module 138 may employ a one-class SVM model with the pre-processed time series. For example, the sampling module 138 may determine a plurality of support vectors via a one-class SVM based on the pre-processed time series information, compute a matrix of pairwise distances between each pair of the support vectors, and determine a kernel of the matrix. In some aspects, the sampling module 138 may employ gaussian RBF as the kernel function used to generate the kernel.

The detection module 140 may be configured to detect baselines changes of the component metrics by comparing a reference distance signature 126 for a component metric to sample distance signature 130 for a component metric. In particular, the detection module 140 may identify an occurrence of a baseline change based on a dissimilarity measure based on the reference distance signature 126 and the sample distance signature 130 being greater than a distance threshold (e.g., the distance threshold determined for the component metric by the training module 136). For instance, in some aspects, the detection module 140 may compute the dissimilarity measure between the regions of the reference distance signature 126 and the sample distance signature 130 (e.g., the kernel matrix distance between the kernel generated by the training module 136 for the reference distance signature 126 and the kernel generated by the sampling module 138 for the sample distance signature 130). In some aspects, determining the dissimilarity measure may require n×m+c computations, where n and m are respectively the support vectors of the train and the sample space and c a small constant. Given that m is usually very small (e.g., around 4-5 vectors), the detection module 140 may efficiently perform inference in the detection phase.

In some aspects, the detection module 140 may be further configured to identify an occurrence of a baseline change based on a median threshold indicating that the baseline change has a predefined level of impact. For example, in response to the dissimilarity measure being greater than the distance threshold, the detection module 140 may further determine a median context of the component metric, i.e., whether a median threshold is applied as a ceiling or floor. For example, a component metric associated with latency may have a median context requiring that the change to the media of the baseline is above a preconfigured threshold (e.g., seventy percentile) while a component metric associated with availability may have a median context requiring that the change to the median of the baseline is below a preconfigured threshold (e.g., thirty percentile). In some aspects, the preconfigured threshold and the median context may be set using the configuration module 132. Once the median context has been identified, the detection module 140 may be configured to determine the median threshold, determine the median of the time series corresponding to the sample distance signature 130, and compare the median to the median threshold. Further, in some aspects, the detection module 140 may detect a baseline change based upon the dissimilarity measure being greater than the distance threshold and the median corresponding to the sample distance signature 130 being greater than the median threshold applied as a floor or less than a media threshold applied as a ceiling.

Further, the incident management module 142 may be configured to provide notification of baseline change activity detected by the detection module 140. For example, the incident management module 142 may receive an indication of a candidate baseline change for a tenant component 116(1) over a particular period of time from the detection module 140, and transmit an alert notification 146 to a tenant device 108(1) associated with the tenant component 116(1). In some aspects, the alert notification 146 may identify the tenant component 116(1).

Figure 2A:
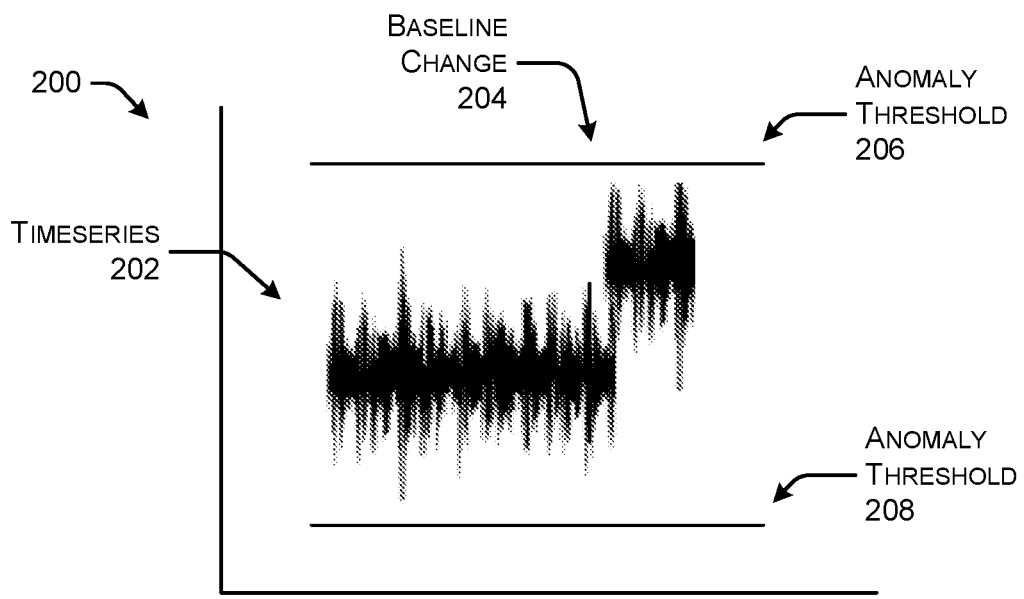
FIG. 2A illustrates an example graphical representation of a baseline change, in accordance with some aspects of the present disclosure.
Figure 2B:
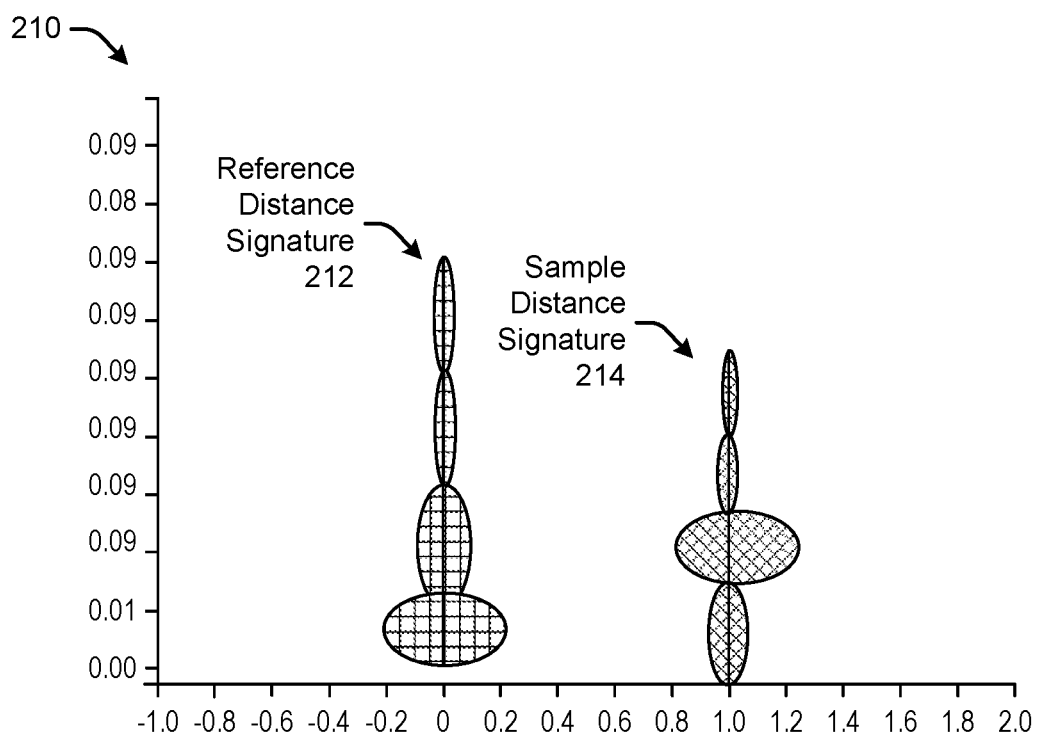
FIG. 2B illustrates an example graphical representation of a reference distance signature and a sample distance signature, in accordance with some aspects of the present disclosure.

FIG. 2A illustrates an example graphical representation 200 of a baseline change, in accordance with some aspects of the present disclosure. As illustrated in FIG. 2A, the graphical representation 200 includes time series 202 that experiences a potential baseline change. As illustrated in FIG. 2, a baseline change 204 may occur that does not include a spike above or below the anomaly thresholds 206-208. FIG. 2B illustrates an example graphical representation 210 of a reference distance signature 212 and a sample distance signature 214, in accordance with some aspects of the present disclosure.

Example Process

The processes described in FIG. 3 below are illustrated as a collection of blocks in a logical flow graph, which represent a sequence of operations that can be implemented in hardware, software, or a combination thereof. In the context of software, the blocks represent computer-executable instructions stored on one or more computer-readable media that, when executed by one or more processors, perform the recited operations. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The operations described herein may, but need not, be implemented using the cloud computing platform 102. By way of example and not limitation, the method 300 is described in the context of FIGS. 1-2 and 4. For example, the operations may be performed by one or more of the baseline monitoring module 124, the configuration module 132, the metrics measurement module 134, the training module 136, the sampling module 138, the detection module 140, and the incident management module 142.

FIG. 3 is a flow diagram illustrating an example method 300 for evaluating peer groups for comparative anomaly, in accordance with some aspects of the present disclosure.

At block 302, the method 300 may include generating a reference distance signature based on historic time series information for a component metric, the historic time series information corresponding to a first period of time. For example, the training module 136 may generate a reference distance signature 126(1) for a component metric of a tenant component 116(1) of the cloud computing platform 102 based on historic information (e.g., the preceding week) within the metrics information 128. In some other examples, the training module 136 may generate a reference distance signature 126(1) for a component metric of a resource 114 or a service 118 of the cloud computing platform 102. In some aspects, the component metric may measure one of a request duration, a dependency duration, or client performance. Further, in some aspects, the reference distance signature 126(1) may be a one-class support vector machine model.

Accordingly, the cloud computing platform 102, the cloud computing device 400, and/or the processor 402 executing the training module 136 may provide means for generating a reference distance signature based on historic time series information for a component metric, the historic time series information corresponding to a first period of time.

At block 304, the method 300 may include generating a sample distance signature based on sample time series information for the component metric, the sample time series information corresponding to a second period of time. For example, the sampling module 138 may generate a sample distance signature 130(1) for a component metric of a tenant component 116(1) of the cloud computing platform 102 from recently-collected information (e.g., preceding four hours) from the metrics information. In some other examples, sampling module 138 may generate a sample distance signature 130(1) for a component metric of a resource 114 or a service 118 of the cloud computing platform 102. Further, in some aspects, the sample distance signature 130(1) may be a one-class support vector machine model.

Accordingly, the cloud computing platform 102, the cloud computing device 400, and/or the processor 402 executing the sampling module 138 may provide means for generating a sample distance signature based on sample time series information for the component metric, the sample time series information corresponding to a second period of time.

At block 306, the method 300 may include comparing the reference distance signature to the sample distance signature to determine a signature difference. For example, the detection module 140 may compute the dissimilarity measure between the regions of the reference distance signature 126 and the sample distance signature 130 (e.g., the kernel matrix distance between the kernel generated by the training module 136 for the reference distance signature 126 and the kernel generated by the sampling module 138 for the sample distance signature 130).

Accordingly, the cloud computing platform 102, the cloud computing device 400, and/or the processor 402 executing the detection module 140 may provide means for comparing the reference distance signature to the sample distance signature to determine a signature difference.

At block 308, the method 300 may include determining that the second period of time is a baseline change candidate based on the signature difference being greater than a distance threshold. For example, the detection module 140 may identify an occurrence of a baseline change based on the dissimilarity measure based on the reference distance signature 126 and the sample distance signature 130 being greater than a distance threshold (e.g., the distance threshold determined for the component metric by the training module 136).

Accordingly, the cloud computing platform 102, the cloud computing device 400, and/or the processor 402 executing the detection module 140 may provide means for determining that the second period of time is a baseline change candidate based on the signature difference being greater than a distance threshold.

At block 310, the method 300 may include presenting, based at least in part on the signature difference, an alert notification identifying the second period of time as the baseline change candidate. For example, the incident management module 142 may be configured to provide notification of baseline change activity detected by the detection module 140. In some aspects, the incident management module 142 may be configured to transmit the alert notification 146 to a tenant device 108 or a management device 144 associated with the tenant component 116(1).

Accordingly, the cloud computing platform 102, the cloud computing device 400, and/or the processor 402 executing the incident management module 142 may provide means for presenting, based at least in part on the signature difference, an alert notification identifying the second period of time as the baseline change candidate.

Additionally, or alternatively, in an aspect, the method 300 may further include generating initial deseasonalized time series information based on the historic time series information, removing outlier datapoints from within the initial deseasonalized time series information to determining updated deseasonalized time series information, the outlier datapoints above a first outlier threshold or below a second outlier threshold, scaling the updated deseasonalized time series information to determine scaled historic time series information, removing one or more outages via an offline algorithm to determine formatted historic time series information, and generating, based on the formatted historic time series information, the reference distance signature via a one-class SVM. For example, the training module 136 may identify a time series for a component metric within the metrics information 128, deseasonalize the time series to generate initial deseasonalized time series information, and/or remove outliers within the time series that are below or above preconfigured thresholds to generate the updated deseasonalized time series information. Further, the training module 136 may scale the time series to a preconfigured range (e.g., between 0 and 1) to generate scaled historic time series information, and/or remove one or more anomalies and/or outages via an offline algorithm to generate the formatted historic time series information. Further, the training module 136 may generate the reference distance signature 126 via a one-class SVM using the pre-processed time series (i.e., the formatted historic time series information).

Accordingly, the cloud computing platform 102, the cloud computing device 400, and/or the processor 402 executing the training module 136 may provide means for generating initial deseasonalized time series information based on the historic time series information, removing outlier datapoints from within the initial deseasonalized time series information to determining updated deseasonalized time series information, the outlier datapoints above a first outlier threshold or below a second outlier threshold, scaling the updated deseasonalized time series information to determine scaled historic time series information, removing one or more outages via an offline algorithm to determine formatted historic time series information, and generating, based on the formatted historic time series information, the reference distance signature via a one-class SVM.

Additionally, or alternatively, in an aspect, the method 300 may further include generating initial deseasonalized time series information based on the historic time series information, removing outlier datapoints from within the initial deseasonalized time series information to determining updated deseasonalized time series information, the datapoints above a first outlier threshold or below a second outlier threshold, scaling the updated deseasonalized time series information to determine formatted historic time series information, and generating, based on the formatted historic time series information, the sample distance signature via a one-class SVM. For example, the sampling module 138 may identify a time series for a component metric within the metrics information 128, deseasonalize the time series to generate initial deseasonalized time series information, and/or remove outliers within the time series that are below or above preconfigured thresholds to generate the updated deseasonalized time series information. Further, the sampling module 138 may scale the time series to a preconfigured range (e.g., between 0 and 1) to generate the formatted historic time series information. Further, the sampling module 138 may generate the sample distance signature 130 via a one-class SVM using the pre-processed time series (i.e., the formatted historic time series information).

Accordingly, the cloud computing platform 102, the cloud computing device 400, and/or the processor 402 executing the training module 136 may provide means for generating initial deseasonalized time series information based on the historic time series information, removing outlier datapoints from within the initial deseasonalized time series information to determining updated deseasonalized time series information, the outlier datapoints above a first outlier threshold or below a second outlier threshold, scaling the updated deseasonalized time series information to determine formatted historic time series information, and generating, based on the formatted historic time series information, the sample distance signature via a one-class SVM.

Additionally, or alternatively, in order to generate the reference distance signature the method 300 may further include determining a first plurality of support vectors based on the historic time series information, and determining a first kernel of a matrix determined from pairwise distances between each pair of the first plurality of support vectors. Accordingly, the cloud computing platform 102, the cloud computing device 400, and/or the processor 402 executing the training module 136 may provide means for determining a first plurality of support vectors based on the historic time series information, and determining a first kernel of a matrix determined from pairwise distances between each pair of the first plurality of support vectors.

Additionally, or alternatively, in order to generate the sample distance signature the method 300 may further include determining a second plurality of support vectors based on recently-collected time series information and determining a second kernel of a matrix determined from pairwise distances between each pair of the second plurality of support vectors. For example, the sampling module 138 may determine a plurality of support vectors via a one-class SVM based on the pre-processed time series information, compute a matrix of pairwise distances between each pair of the support vectors, and determine a kernel of the matrix. In some aspects, the sampling module 138 may employ gaussian RBF as the kernel function used to generate the kernel. Accordingly, the cloud computing platform 102, the cloud computing device 400, and/or the processor 402 executing the training module 136 may provide means for determining a second plurality of support vectors based on recently-collected time series information and determining a second kernel of a matrix determined from pairwise distances between each pair of the second plurality of support vectors.

Additionally, or alternatively, the method 300 may further include determining a plurality of time series windows within the historic time series information, determining a plurality of time series window scores for the plurality of time series windows, each window score representing a distance between an individual time series window and the plurality of time series windows, and determining the distance threshold by applying a three-sigma calculation to the plurality of time series window scores. For example, the training module 136 may be configured to partition a time series for a component metric of a cloud component into a plurality of time series windows, and determine a distance score for each of the plurality of time series windows. In some aspects, each distance score represents a distance between an individual time series window and the other plurality of time series windows. Further, the training module 136 may determine the distance threshold by generating a vector of the distance scores and applying a three-sigma calculation to the vector to identify an abnormal score for the time series. Accordingly, the cloud computing platform 102, the cloud computing device 400, and/or the processor 402 executing the training module 136 may provide means for determining a plurality of time series windows within the historic time series information, determining a plurality of time series window scores for the plurality of time series windows, each window score representing a distance between an individual time series window and the plurality of time series windows, and determining the distance threshold by applying a three-sigma calculation to the plurality of time series window scores.

Additionally, or alternatively, in an aspect, the method 300 may further include determining a median context based on the component metric, identifying a median threshold associated with the median context, and determining a median value meets the median threshold, wherein to presenting the alert notification, comprises presenting the alert notification based at least in part on the median value meeting the median threshold. For example, the detection module 140 may be configured to determine the median context, determine the median threshold based on the media context, determine the median of the time series corresponding to the sample distance signature 130, and compare the median to the median threshold. Further, in some aspects, the detection module 140 may detect a baseline change based upon the dissimilarity measure being greater than the distance threshold and the median corresponding to the sample distance signature 130 meeting the median threshold (i.e., being greater than a median threshold with a floor as the median context, or being less than a median threshold with a ceiling as the median context).

Accordingly, the cloud computing platform 102, the cloud computing device 400, and/or the processor 402 executing the detection module 140 may provide means for determining a median context based on the component metric, identifying a median threshold associated with the median context, and determining the median is meets the median threshold, wherein to present the alert notification, the at least one processor is configured to present the alert notification based at least in part on the median value meeting the median threshold.

While the operations are described as being implemented by one or more computing devices, in other examples various systems of computing devices may be employed. For instance, a system of multiple devices may be used to perform any of the operations noted above in conjunction with each other.

Illustrative Computing Device

Figure 4:
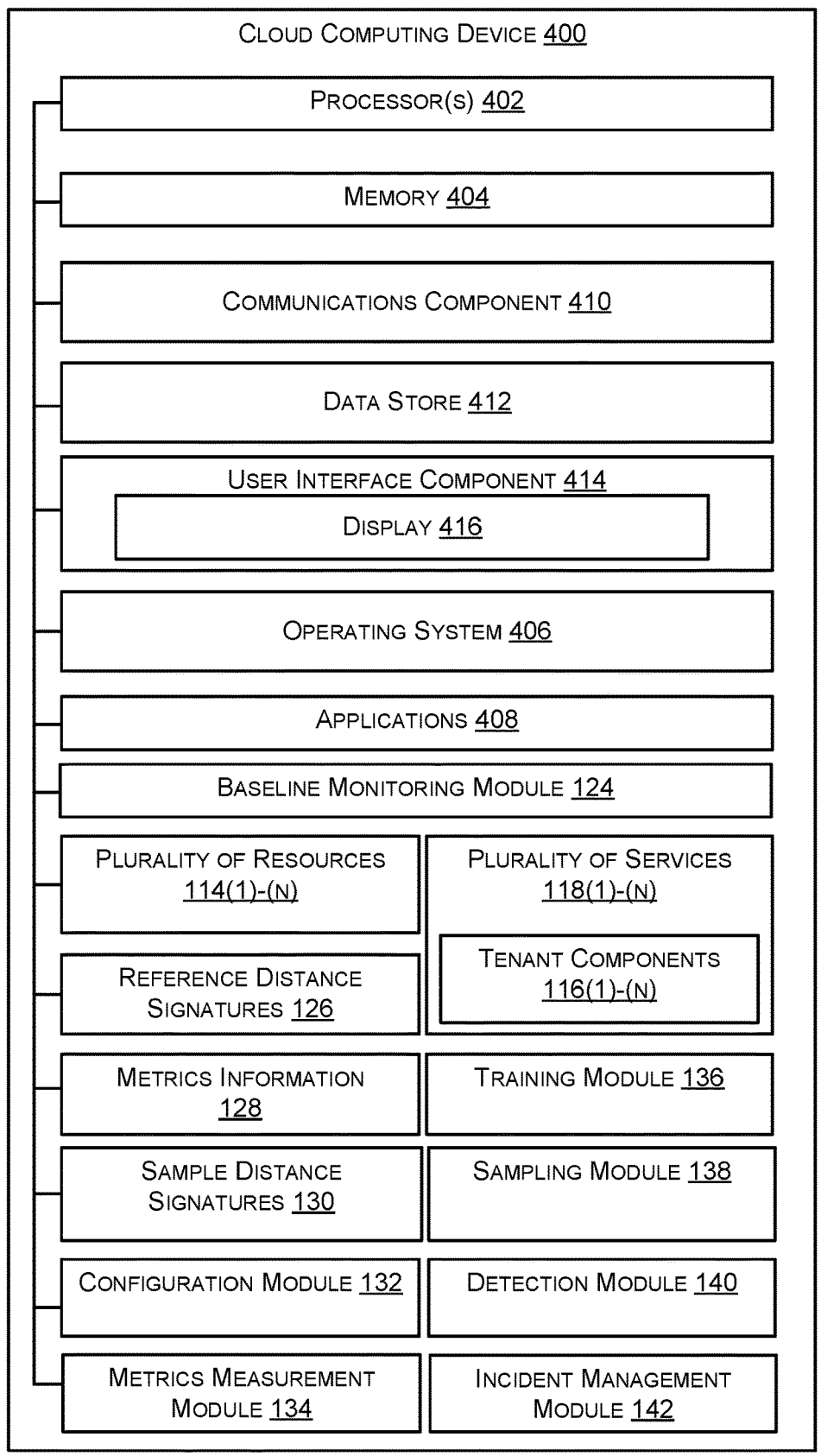
FIG. 4 is a block diagram illustrating an example of a hardware implementation for a cloud computing device(s), in accordance with some aspects of the present disclosure.

Referring now to FIG. 4, an example of a cloud computing device(s) 400 (e.g., cloud computing platform 102). In one example, the cloud computing device(s) 400 includes the processor 402 for carrying out processing functions associated with one or more of components and functions described herein. The processor 402 can include a single or multiple set of processors or multi-core processors. Moreover, the processor 402 may be implemented as an integrated processing system and/or a distributed processing system. In an example, the processor 402 includes, but is not limited to, any processor specially programmed as described herein, including a controller, microcontroller, a computer processing unit (CPU), a graphics processing unit (GPU), an application specific integrated circuit (ASIC), a field programmable gate array (FPGA), a system on chip (SoC), or other programmable logic or state machine. Further, the processor 402 may include other processing components such as one or more arithmetic logic units (ALUs), registers, or control units.

In an example, the cloud computing device 400 also includes the memory 404 for storing instructions executable by the processor 402 for carrying out the functions described herein. The memory 404 may be configured for storing data and/or computer-executable instructions defining and/or associated with the operating system 406, the baseline monitoring module 124, the configuration module 132, the metrics measurement module 134, the training module 136, the sampling module 138, the detection module 140, the incident management module 142, and the processor 402 may execute the operating system 406, the baseline monitoring module 124, the configuration module 132, the metrics measurement module 134, the training module 136, the sampling module 138, the detection module 140, and the incident management module 142. An example of memory 404 may include, but is not limited to, a type of memory usable by a computer, such as random access memory (RAM), read only memory (ROM), tapes, magnetic discs, optical discs, volatile memory, non-volatile memory, and any combination thereof. In an example, the memory 404 may store local versions of applications being executed by processor 402.

The example cloud computing device 400 also includes a communications component 410 that provides for establishing and maintaining communications with one or more parties utilizing hardware, software, and services as described herein. The communications component 410 may carry communications between components on the cloud computing device 400, as well as between the cloud computing device 400 and external devices, such as devices located across a communications network and/or devices serially or locally connected to the cloud computing device 400. For example, the communications component 410 may include one or more buses, and may further include transmit chain components and receive chain components associated with a transmitter and receiver, respectively, operable for interfacing with external devices. In an implementation, for example, the communications component 410 may include a connection to communicatively couple the client devices 104(1)-(N) to the processor 402.

The example cloud computing device 400 also includes a data store 412, which may be any suitable combination of hardware and/or software, that provides for mass storage of information, databases, and programs employed in connection with implementations described herein. For example, the data store 412 may be a data repository for the operating system 406 and/or the applications 408.

The example cloud computing device 400 also includes a user interface component 414 operable to receive inputs from a user of the cloud computing device 400 and further operable to generate outputs for presentation to the user. The user interface component 414 may include one or more input devices, including but not limited to a keyboard, a number pad, a mouse, a touch-sensitive display (e.g., display 416), a digitizer, a navigation key, a function key, a microphone, a voice recognition component, any other mechanism capable of receiving an input from a user, or any combination thereof. Further, the user interface component 414 may include one or more output devices, including but not limited to a display (e.g., display 416), a speaker, a haptic feedback mechanism, a printer, any other mechanism capable of presenting an output to a user, or any combination thereof.

In an implementation, the user interface component 414 may transmit and/or receive messages corresponding to the operation of the operating system 406 and/or the applications 408. In addition, the processor 402 executes the operating system 406 and/or the applications 408, and the memory 404 or the data store 412 may store them.

Further, one or more of the subcomponents of the baseline monitoring module 124, the configuration module 132, the metrics measurement module 134, the training module 136, the sampling module 138, the detection module 140, and the incident management module 142, may be implemented in one or more of the processor 402, the applications 408, the operating system 406, and/or the user interface component 414 such that the subcomponents of the baseline monitoring module 124, the configuration module 132, the metrics measurement module 134, the training module 136, the sampling module, the detection module 140, and the incident management module 142, are spread out between the components/subcomponents of the cloud computing device 400.

CONCLUSION

In closing, although the various embodiments have been described in language specific to structural features and/or methodological acts, it is to be understood that the subject matter defined in the appended representations is not necessary limited to the specific features or acts described. Rather, the specific features and acts are disclosed as example forms of implementing the claimed subject matter.

What is claimed is:

1. A cloud computing platform device, comprising:
a memory storing instructions; and
at least one processor communicatively coupled with the memory and configured to:
generate a reference distance signature based on historic time series information for a component metric, the historic time series information corresponding to a first period of time, wherein generating the reference distance signature comprises:
determining a first plurality of support vectors based on the historic time series information; and
determining a first kernel of a matrix determined from pairwise distances between each pair of the first plurality of support vectors;
generate a sample distance signature based on sample time series information for the component metric, the sample time series information corresponding to a second period of time, wherein generating the sample distance signature comprises:
determining a second plurality of support vectors based on the recently-collected time series information; and
determining a second kernel of a matrix determined from pairwise distances between each pair of the second plurality of support vectors;
compare the reference distance signature to the sample distance signature to determine a signature difference;

determine that the second period of time is a baseline change candidate based on the signature difference being greater than a distance threshold; and present, based at least in part on the signature difference, an alert notification identifying the second period of time as the baseline change candidate.

2. The cloud computing platform device of claim 1, wherein the reference distance signature is a generated via a first one-class support vector machine (SVM) model, and the sample distance signature is generated via a second one-class SVM model.

3. The cloud computing platform device of claim 1, wherein to determine the reference distance signature, the at least one processor is configured to:
generate initial deseasonalized time series information based on the historic time series information;
remove outlier datapoints from within the initial deseasonalized time series information to determine updated deseasonalized time series information, the outlier datapoints above a first outlier threshold or below a second outlier threshold;
scale the updated deseasonalized time series information to determine scaled historic time series information;
remove one or more outages via an offline algorithm to determine formatted historic time series information; and
generate, based on the formatted historic time series information, the reference distance signature via a one-class SVM.

4. The cloud computing platform device of claim 1, wherein to determine the sample distance signature, the at least one processor is configured to:
generate initial deseasonalized time series information based on the sample time series information;
remove outlier datapoints from within the initial deseasonalized time series information to determine updated deseasonalized time series information, the outlier datapoints above a first outlier threshold or below a second outlier threshold;
scale the updated deseasonalized time series information to determine formatted sample time series information; and
generate, based on the formatted sample time series information, the reference distance signature via a one-class SVM.

5. The cloud computing platform device of claim 1, wherein the signature difference is a kernel matrix distance between the first kernel and the second kernel.

6. The cloud computing platform device of claim 1, wherein the at least one processor is further configured to:
determine a plurality of time series windows within the historic time series information;
determine a plurality of time series window scores for the plurality of time series windows, each window score representing a distance between an individual time series window and the plurality of time series windows; and
determine the distance threshold by applying a three-sigma calculation to the plurality of time series window scores.

7. The cloud computing platform device of claim 1, wherein the at least one processor is further configured to:
determine a median context based on the component metric;
identify a median threshold associated with the median context; and
determine a median value meets the median threshold, wherein to present the alert notification, the at least one processor is configured to present the alert notification based at least in part on the median value meeting the median threshold.

8. The cloud computing platform device of claim 1, wherein the component metric of corresponds to a measurement of an attribute of at least one of: a cloud application, a cloud service, or a cloud resource.

9. The cloud computing platform device of claim 1, wherein the component metric measures one of a request duration, a dependency duration, or client performance.

10. A method, comprising:
generating a reference distance signature based on historic time series information for a component metric, the historic time series information corresponding to a first period of time, the reference distance signature being generated via a first one-class support vector machine (SVM) model;
generating a sample distance signature based on sample time series information for the component metric, the sample time series information corresponding to a second period of time, the sample distance signature being generated via a second one-class SVM model;
comparing the reference distance signature to the sample distance signature to determine a signature difference;
determining that the second period of time is a baseline change candidate based on the signature difference being greater than a distance threshold; and
presenting, based at least in part on the signature difference, an alert notification identifying the second period of time as the baseline change candidate.

11. The method of claim 10, further comprising:
determining a median context based on the component metric;
identifying a median threshold associated with the median context; and
determining a median value meets the median threshold, wherein presenting the alert notification comprises presenting the alert notification based at least in part on the median value meeting the median threshold.

12. The method of claim 10, further comprising:
determining a plurality of time series windows within the historic time series information;
determining a plurality of time series window scores for the plurality of time series windows, each window score representing a distance between an individual time series window and the plurality of time series windows; and
determining the distance threshold by applying a three-sigma calculation to the plurality of time series window scores.

13. The method of claim 10, wherein the component metric corresponds to a measurement of an attribute of a cloud application, a cloud service, or a cloud resource.

14. The method of claim 10, wherein the component metric measures one of a request duration, a dependency duration, or client performance.

15. A non-transitory computer-readable device storing instructions thereon that, when executed by at least one computing device, causes the at least one computing device to perform operations comprising:
generating a reference distance signature based on historic time series information for a component metric, the historic time series information corresponding to a first period of time;

generating a sample distance signature based on sample time series information for the component metric, the sample time series information corresponding to a second period of time;

comparing the reference distance signature to the sample distance signature to determine a signature difference;

determining that the second period of time is a baseline change candidate based on the signature difference being greater than a distance threshold, wherein determining the distance threshold comprises:

determining a plurality of time series windows within the historic time series information;

determining a plurality of time series window scores for the plurality of time series windows, each window score representing a distance between an individual time series window and the plurality of time series windows; and determining the distance threshold by applying a three-sigma calculation to the plurality of time series window scores; and presenting, based at least in part on the signature difference, an alert notification identifying the second period of time as the baseline change candidate.

16. The non-transitory computer-readable device of claim 15, wherein the reference distance signature is a generated via a first one-class support vector machine (SVM) model, and the sample distance signature is generated via a second one-class SVM model.

17. The non-transitory computer-readable device of claim 15, further comprising:

determining a median context based on the component metric;

identifying a median threshold associated with the median context; and determining a median value meets the median threshold, wherein presenting the alert notification comprises presenting the alert notification based at least in part on the median value meeting the median threshold.

18. The non-transitory computer-readable device of claim 15, wherein the component metric corresponds to a measurement of an attribute of a cloud application, a cloud service, or a cloud resource.

19. The non-transitory computer-readable device of claim 15, wherein the component metric measures one of a request duration, a dependency duration, or client performance.

20. The non-transitory computer-readable device of claim 15, wherein the signature difference is a kernel matrix distance between a first kernel of a matrix and a second kernel of a matrix.

* * * * *